United States Patent [19]

Smith

[11] 3,852,599
[45] Dec. 3, 1974

[54] VIAL TRANSFER MECHANISM
[75] Inventor: Roy E. Smith, Villa Park, Ill.
[73] Assignee: Packard Instrument Company, Inc., Downers Grove, Ill.
[22] Filed: July 9, 1973
[21] Appl. No.: 377,392

[52] U.S. Cl................. 250/328, 250/493, 250/497
[51] Int. Cl. ............................................. G01t 1/00
[58] Field of Search.................... 250/328, 493, 497

[56] References Cited
UNITED STATES PATENTS

| | | | |
|---|---|---|---|
| 2,843,753 | 7/1958 | Meeder.............................. | 250/328 |
| 3,553,454 | 1/1971 | Olson................................. | 250/328 |
| 3,722,719 | 3/1973 | Frank................................. | 250/328 |

*Primary Examiner*—James W. Lawrence
*Assistant Examiner*—Harold A. Dixon
*Attorney, Agent, or Firm*—Wolfe, Hubbard, Leydig, Voit & Osann, Ltd.

[57] ABSTRACT

A vial transfer mechanism is provided for transferring radioactive samples from a sample changer to a radioactivity counting or measurement chamber via a bottom access conduit. Vials are lowered, either individually or as a group, from the sample changer into a sample-receiving carriage, which then moves along a horizontal conduit to a position underneath the measurement chamber. An elevator then lifts the sample from the carriage into the chamber. Light tightness is provided by equipping the carriage with O rings so that the chamber is not exposed to atmospheric illumination. The device is particularly useful for the simultaneous counting of two or more samples, where the samples are located in proximity to each other while in the sample changer, but must be spaced away from each other during radioactive measurement.

7 Claims, 6 Drawing Figures

VIAL TRANSFER MECHANISM

CROSS-REFERENCES TO RELATED APPLICATIONS

References made to Frank et al. Ser. No. 27,406, and to Frank application Ser. No. 27,411, now U.S. Pat. No. 3,722,719, both applications filed Apr. 10, 1970.

BACKGROUND OF THE INVENTION

This invention relates to sample transfer devices, and more particularly concerns the provision of an automatic sample transferring device for moving samples from a sample changer containing a large number of samples, to a sample measuring chamber or zone in which the samples are individually analyzed. In a particular, though not exclusive, aspect, the invention is directed to providing a sample transfer mechanism for transferring vials of radioactive material from a sample changer to a scintillation counting chamber which detects and measures light scintillations produced by radioactive decay. The invention will accordingly be described in relation to this specific type measurement.

Liquid scintillation apparatus, designed to provide spectral analysis of test samples containing one or more radioactive isotopes disposed in a liquid scintillator, are now commonplace in many biochemical laboratories. Normally, the apparatus is operated automatically, and merely requires that vials containing the sample and scintillator be loaded into a suitable magazine, which then sequentially feeds the vials one-by-one to a scintillation measurement or counting zone, where the samples are retained for a predetermined interval while the analysis is performed. Magazines of various types are known, and include the annular trays of U.S. Pat. No. 3,257,561 to Packard et al., the rectangular trays of U.S. Pat. No. 3,722,719, endless belts composed of vial-receiving cylinders, and the like. The objective of these sample changers is, of course, to retain a large number of samples so that they may be analyzed automatically and sequentially.

Unfortunately, the design, construction, and maintenance of sample changers and other sample transferring auxiliaries present many problems. Customarily, the scintillation counting zone or chamber is accessible through a top entry well, and while this facilitates transport of the samples, it likewise permits ready entry of dirt and other contaminants into the sensitive chamber. Also, because the scintillation-responsive vacuum tube photomultipliers are necessarily highly sensitive to light, light entry into the scintillation counting zone during sample transfer must be avoided; the art is replete with complicated light seals, sample transferring locks, light shutters, labyrinths, etc. Accordingly, an object of the invention is to provide a sample measurement device which is virtually, if not completely, resistant to the entry of dirt and debris, and which is readily made light tight. A related object is to provide a sample transfer device which remains light tight notwithstanding extended component wear, and which is readily and economically manufactured, and unusually durable and trouble-free to use.

Further, from the standpoint of providing a compact automatic scintillation spectrometer or other multiple-sample analytic device, it is desirable that the samples, while in the sample changer or magazine, be as closely packed as possible. Where the spectrometer, however, is intended to analyze a plurality of radioactive samples simultaneously, it is necessary that the samples be positioned remotely from each other to allow for the dimensions of the photomultiplier tubes. Accordingly, another object of the invention is to provide a sample transfer mechanism capable of transferring two or more samples simultaneously from their proximate or adjacent positions in a sample changer, to a corresponding number of sample measurement chambers or zones in which the respective samples are physically and radioactively remote from each other.

BRIEF DESCRIPTION OF DRAWINGS

Other objects, aims, and advantages of the invention will become apparent upon reading the following detailed description and upon reference to the appended drawings, in which.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DESCRIPTION OF THE PREFERRED EMBODIMENT

As previously indicated, the invention has particular applicability in the transfer of one or more sample vials from a sample changer to the counting or measuring chamber (or chambers) of a scintillation spectrometer, and accordingly will be discussed in this connection. For the same reason, the transfer device will be described with reference to a device capable of handling two samples simultaneously; that is, which is capable of withdrawing two or more sample vials at a time from a changer in which the samples are located in close proximity, and simultaneously transferring the samples to a corresponding number of measurement chambers where the samples are both physically and radioactively remote from each other.

Figure 1:
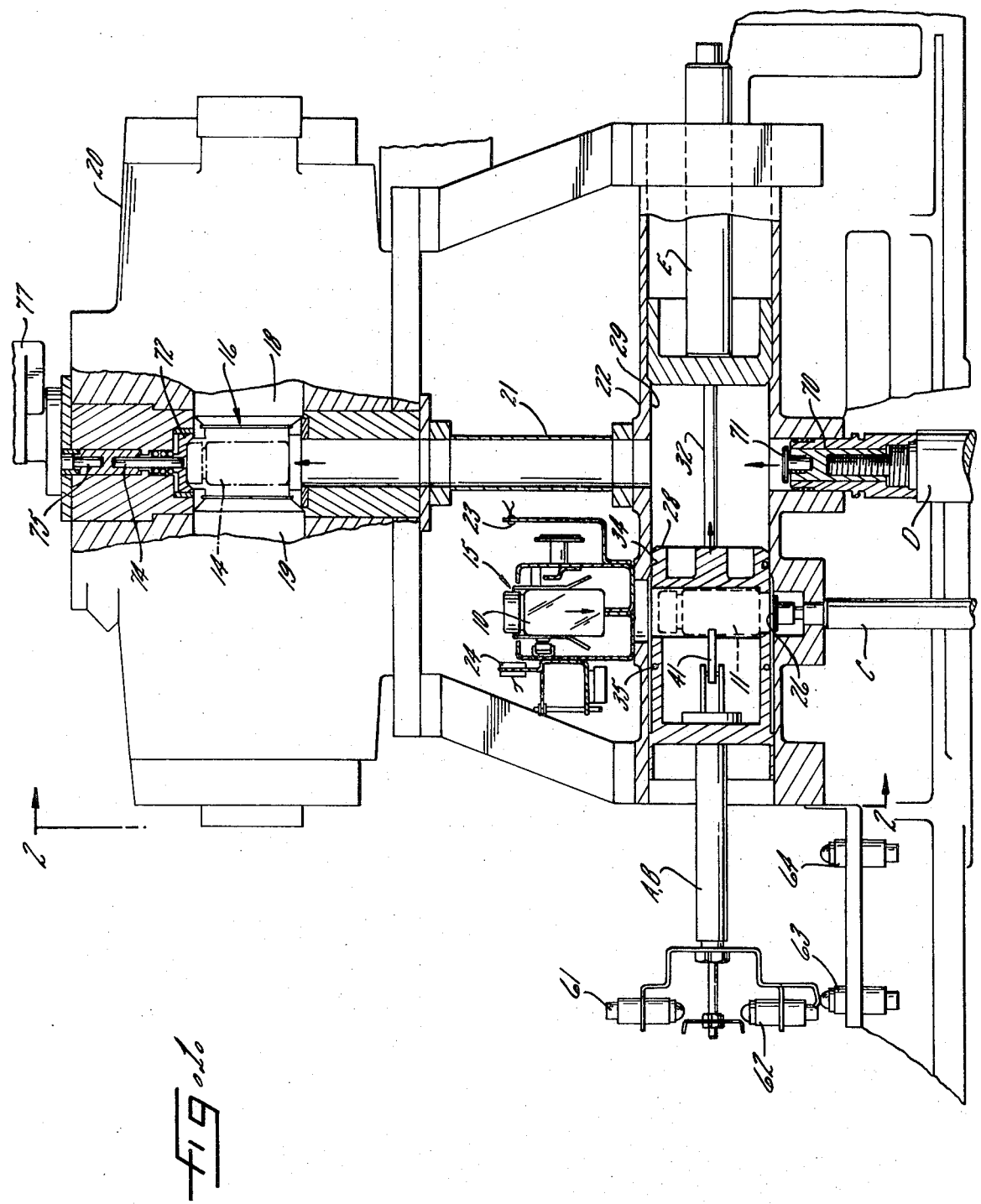
FIG. 1 is a front elevational view, partly in section, showing a scintillation spectrometer embodying the present invention, and indicating (in solid lines) the initial sample vial position (10) and, in phantom, subsequent sample vial positions (11, 14)

Turning first to FIG. 1, a device according to the invention is shown in front elevational view in the initial stage of transferring a sample vial 10 from its first position 10 in a sample changer 15, to its ultimate position 14 in a scintillation measurement and counting zone 16. The scintillation counting zone is defined by a pair of light-responsive photomultiplier tubes 18, 19 contained within a lead shield 20 which prevents the entry of ambient radiation. The counting chamber 16 is accessible through its bottom or lower portion via a vertical sample transferring conduit 21, which extends from the zone 16 to a horizontal sample transferring conduit 22.

The vertical conduit 21 and the horizontal conduit 22 are so dimensioned that a standard cylindrical sample vial, of 1 1/16 inches O.D. by 2 7/16 inches in height, can pass through the conduits while in a vertical position. Both of the conduits 21, 22 are advantageously cylindrical in cross section, as this facilitates manufacture and assembly, but, particularly with respect to the horizontal conduit 22, this is not essential.

As noted earlier, and as shown in FIGS. 1 and 2, the sample vials are initially adjacent to each other and are moved along a horizontal sample changer 15 which presents the samples to the transfer mechanism for ultimate transfer to the counting zone 16. Sample changers may be of a variety of types, but the tray-type changer described in the Frank applications is particularly suitable from the standpoint of operator flexibility and compact sample storage.

In any event, as the samples are advanced through the changer 15 the presence of a sample vial is indicated by the vial cap interrupting a light beam emitted by a light-emitting diode 23 and sensed by a photoconductive switch 24. The switch 24 then commences a sequence of transfer operations to move the vial from its position indicated at 10 to its ultimate position shown at 14.

In the first transfer step, a pneumatic or other fluid-activated pistondriving cylinder C, upon which is mounted a sample vial elevator platform 26, is retracted to the position shown in FIG. 1, thereby causing the sample vial to be lowered from its position shown in solid lines at 10 to its position shown in phantom lines as 11. (FIG. 4 depicts the position 11 after the cylinder C has lowered the vial.)

Figure 3:
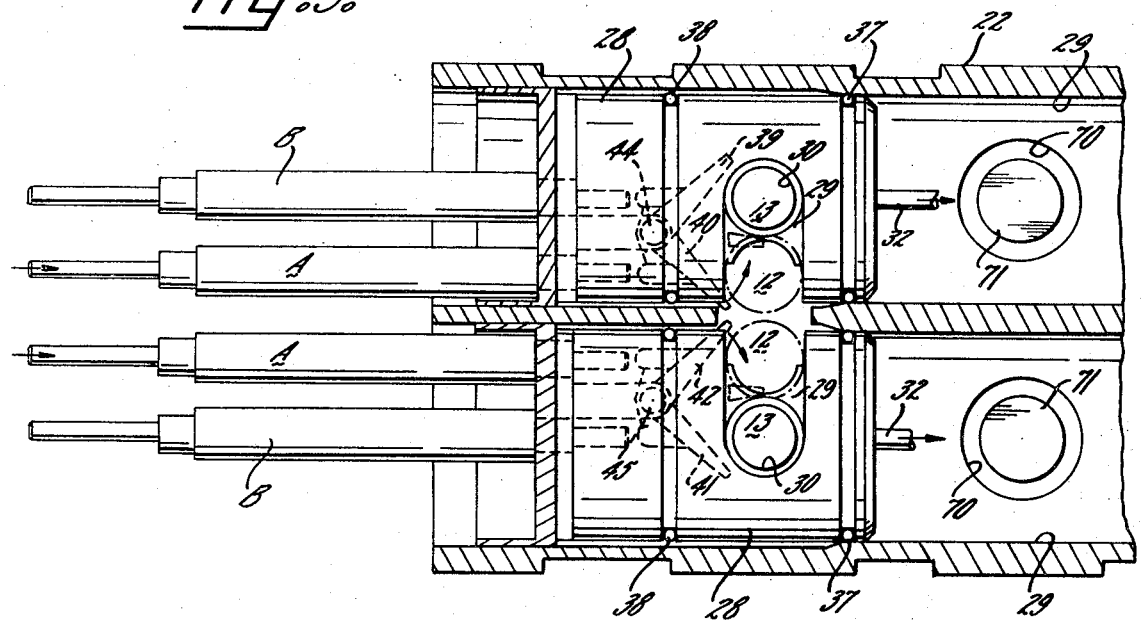
FIG. 3 is a top sectional view, taken along plane 3—3 of FIG. 2, illustrating the movement of a pair of sample vials from positions identified as 12 to positions 13 en route to the scintillation counting zone.
Figure 4:
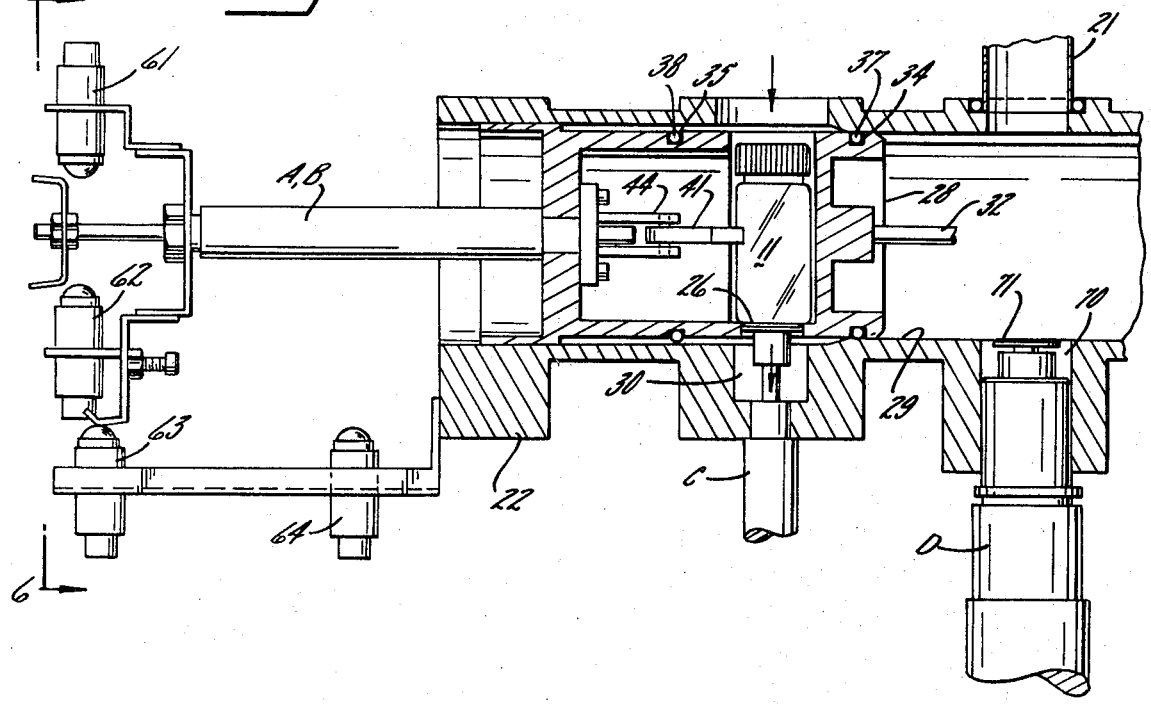
FIG. 4 is a partial front elevational view, in section, corresponding to the second sample position (11) which follows the initial position depicted in FIG. 1.

Once the cylinder C has been retracted to the position shown in FIGS. 1 and 4, the sample vial is at its second position, or position 11. Here it is contained within a cylindrical sample-receiving carriage 28 which is slidably movable within a bore 29 defined by the horizontal sample transferring conduit 22. The vial is supported on a platform within the shuttle-like carriage 28 by a platform 29 (FIG. 3) provided with a vertical port 30 of lesser diameter than the OD of the vial, but sufficiently large to permit complete retraction of the elevator platform 26 (FIG. 1).

Figure 5:
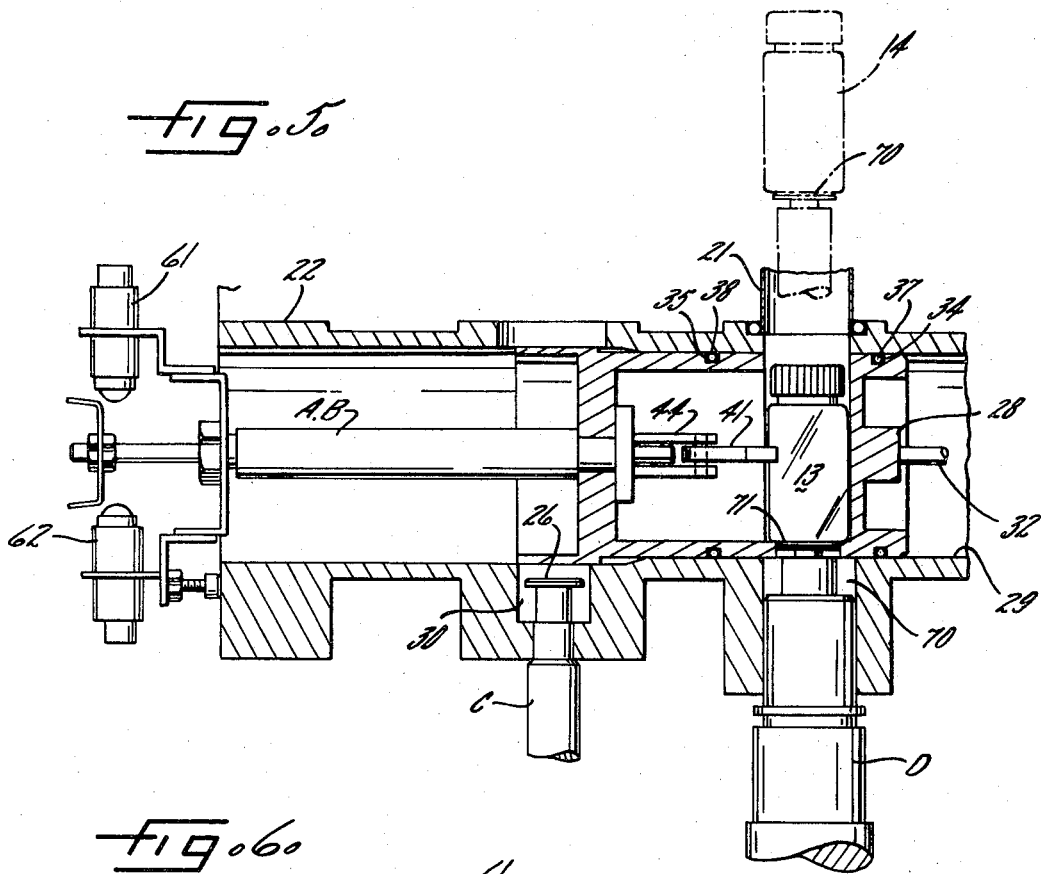
FIG. 5 is a partial front elevation corresponding to FIG. 4, except that the sample vials are in the third position (solid lines, 13) and fourth position (phantom, 14) in the transport sequence.
Figure 6:
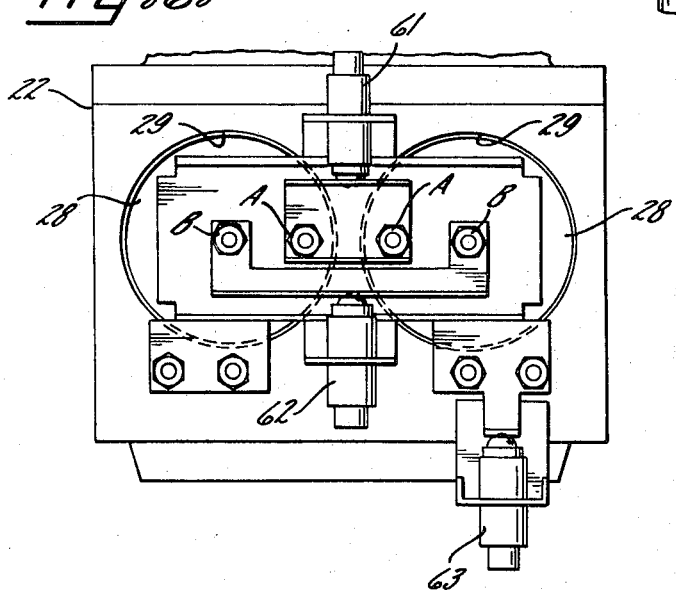
FIG. 6 is a partial side view, taken along plane 6—6 of FIG. 4, further illustrating the assembly and construction of a multiple sample transferring device according to the invention.

In the embodiment shown in the drawings, two such shuttle carriages 28 are used, which are mirror images of each other. When two such carriages 28 are used, and when they are provided with a device for effecting transverse movement of the vials while contained in the pistons, the sample transferring device permit simultaneous measurement and counting of two (or more) radioactive samples that are close together in the sample changer 15 (FIG. 1) but which must be spaced apart (FIG. 2; position 14) during scintillation counting both physically to allow for the dimensions of the photomultiplier tubes 18, 19 (FIG. 1). Transverse horizontal movement of the vials from their second positions (12 in FIG. 3) to their respective third positions (13 in FIG. 3) will be described momentarily. Once the cylinder (or cylinders) C (FIG. 1) has retracted, it trips a valve, not shown, that admits air to the pneumatic cylinders A. When cylinders A complete their strokes, a valve is tripped that admits air to cylinders E. Since the cylinders E are coupled by shafts 32 to the carriages 28, this movement moves the carriages 28 from its corresponding position beneath the sample changer 15 to a second position, shown in FIG. 5, beneath the vertical sample transferring conduit 21 (FIGS. 1, 5).

An important feature of the carriage 28 is that it is readily made light-tight, that is, it is constructed so that no light from the atmosphere can enter via the vertical sample transferring conduit 21 into the scintillation counting chamber 16 to produce false indications of sample radioactivity. Transmittal of light is readily prevented by making the carriage 28 of an opaque material and closely fitting it to the bore 29 of the horizontal sample transferring conduit 22 (FIG. 1) but, for more positive prevention, the carriage 28 is provided with a pair of circumferential grooves 32, 35 (FIG. 1, 4, 5) into which are fitted resilient O-rings 37, 38, respectively. The forward groove 34 is located so that its corresponding O-ring 37 is always contained within the horizontal bore 29, and the rearward groove 35 is located so that it closes off the bore 29 just prior to the time that the forward groove 34 reaches the open bottom portion of the vertical sample transferring conduit 21.

Figure 2:
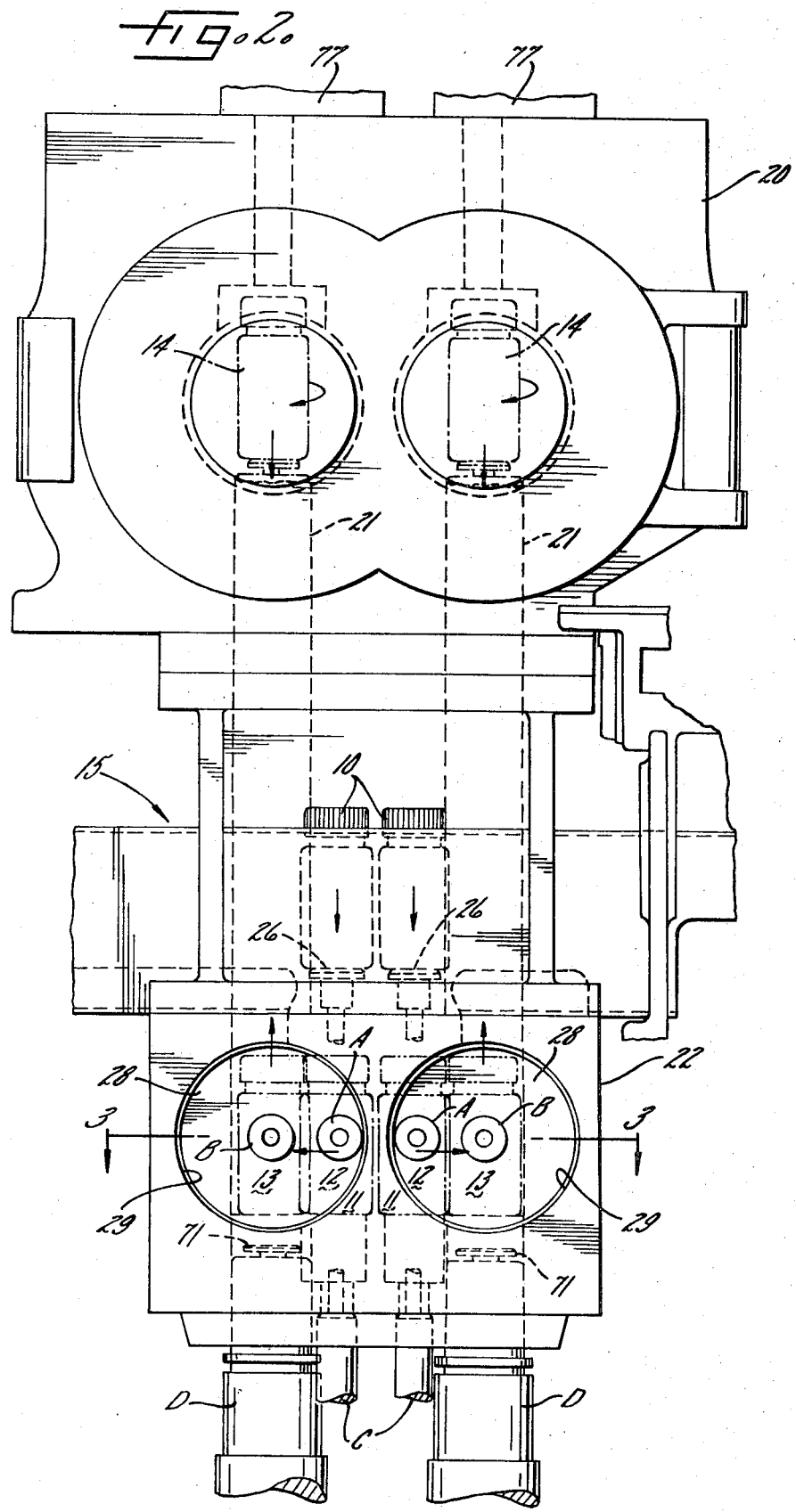
FIG. 2 is a side elevational view in partial section, taken along plane 2—2 of FIG. 1, illustrating the transfer mechanism used for simultaneously handling two sample vials, the vials being shown, sequentially, in positions 10, 11–12, 13, and 14 corresponding successively from their initial position in a sample changer to their ultimate position in the scintillation counting zone or chamber.

As thus far described, the sample transferring device lowers a vial from its initial position 10 (FIG. 1) to a second position 11 (FIG. 4) and thence to a third position 12 (see FIG. 2). However, in the structure depicted in the drawings, the position 12 is not directly beneath the vertical sample transferring conduit 21 of the sample counting chamber 16; the vial or vials must be moved from their position 12 to a position 13 directly beneath the conduit 21.

To effect this transverse and horizontal displacement from the vial position 12 to the position 13, each carriage 28 is provided with a pair of lever-like pawls 39, 40 and 41, 42 pivoted about a common axis 44, 45, with one end of each pawl adapted to be engaged by a piston shaft associated with two cylinders, A and B. Where two or more carriages 28 are used, each such carriage has a pair of cylinders A, B, the respective cylinders A all being interconnected as are the respective cylinders B. Actuation of the cylinders A (FIG. 3) causes the pawls 40, 42 to slide a vial from its position 12 to a position 13, while actuation of the cylinders B causes the pawls 39, 41 to return the vials from their positions 13 to the positions 12.

Thus, before, movement of the carriage 28 from its initial (FIG. 4) position to its final (FIG. 5) position, the cylinders A (FIG. 3) are pneumatically activated to slide the sample vials from their adjacent positions 12 to their remote positions 13. Conveniently, this is effected by coupling the cylinder C (FIG. 1) to a valve in the air lines to the cylinders A (FIG. 3) and so positioned that the valve or valves opens when the cylinder C has completed its downward stroke. When this occurs, the pawls 40, 42 (FIG. 3) cause the vials to slide laterally in the shuttle or carriage 28 until they are spread the same distance apart as the counting chambers. This occurs while the carriage 28 is in its initial, or FIG. 4, position.

Once the cylinders A (FIG. 3) have completed their strokes, they activate a valve 61 (FIGS. 1, 4) which causes the cylinders E (FIG.1) to move the carriages 28, with the vials pocketed within them, until the vials are aligned with the counting and measuring chambers 16 (FIG. 1, 5).

When the strokes of the cylinders E are completed, the valve 64 is activated, which causes the cylinders A to release the vials and which energizes a pair of vertical elevating cylinders D.

The cylinders D are normally recessed, as shown in FIG. 1, to permit the carriage 28 to move freely over the cylinder D position. Once activated, however, the cylinder D piston ascends, first to a position shown in FIG. 5 where it commences to lift the sample vial, and ultimately to a position as shown in phantom in FIG. 5 where the vial, in position 14, is in the counting chamber 16 (FIG. 1).

The shaft 70 of the cylinder D, as best shown in FIG. 1, is provided with a rotatable elevator platform 71 which actually contacts the sample vials. By reason of the rotatable platform 71, both the platform and the vial may be rotated about their vertical axis while in the counting chamber 16 when a shaft 74, coupled to a spring loaded resilient cap 72, is brought into clutching engagement with a coaxial shaft 75 connected to a 10 r.p.m. electric motor 77. Rotation of a sample vial while undergoing scintillation spectrometric analysis has been found to materially increase the precision and accuracy of the analysis, as described in U.S. Pat. No. 3,493,749.

When the cylinders D (FIG. 5) having completed their upward strokes they activate a limit switch, not shown, which starts the scintillation counting cycle, and causes the vials to rotate about their vertical axes. Counting continues, according to pre-set counting parameters, for a predetermined length of time or until a predetermined number of counts is recorded.

When the counting cycle is completed, an electrical signal from the scintillation counter activates a solenoid valve which reverses the previously described sequence. First, the cylinders D are lowered from their phantom position (FIG. 5) which thereby deposits the vials from their counting position 14 into the shuttle carriage 28. Completion of the downward strokes of the cylinders D activates a second valve which causes the cylinders E (FIG. 1) to return to their starting position of FIGS. 1, 4, which correspondingly returns the carriage 28 to its position as shown in those figures.

When the cylinders E have completed their return strokes, they activate the valve 63 which energizes the cylinders B (FIG. 3) to move the pawls 39, 41 so as to slide the vials inwardly from their positions 13 to the positions 12. Completion of the strokes of the cylinders B is indicated by engagement of the valve 62, causing the cylinders C to extend and thereby raise the sample vials from the position 11 (FIGS. 1, 2) to their initial positions 10 in the sample changer 15. Completion of the upward strokes of the cylinders C causes activation of a limit switch, which operates through a relay to advance the changer 15 and bring two new vials into the initial position 10 (FIG. 2), whereupon the light beam from the diode 23 is interrupted, the interruption is detected by the light-responsive detector 24, and the cycle repeated.

While the construction has been described with reference to a dual sample changer, it is evident that the principles are essentially the same whether a single sample at a time is to be transferred (except that there is no need for the cylinders A and B) or whether more than two samples are to be transferred simultaneously. In the latter case, a corresponding number of counting chambers 16 and vertical sample transferring conduits 21 is provided, and suitable transverse sample spreading pawls are employed to align the respective samples with their associated vertical conduits and chambers.

A particularly noteworthy feature of the invention is that there is little or no possibility of dirt or other contamination to enter the sample counting chamber 16. Thus, excellent light transmitting efficiency, and correspondingly high scintillation detection efficiency, is preserved throughout long apparatus life. Moreover, there are no complicated light seals, locks, shutters, or labyrinth to become fouled or worn, and consequently all external light is effectively excluded from the sample measuring or counting zone.

Thus it is apparent that there has been provided, in accordance with the invention, a sample transferring device which fully satisfies the objects, aims, and advantages set forth above.

I claim:

1. A device for transferring samples from a sample changer to a measurement chamber and for thereafter returning said samples to the sample changer after a measurement period, comprising:
   a sample changer accessible through the bottom thereof,
   a vertical sample transferring conduit extending to said chamber,
   a horizontal sample transferring conduit extending to said vertical sample transferring conduit,
   a sample-receiving carriage movable in said horizontal sample transferring conduit between a sample receiving position near said sample changer and a position beneath said vertical sample transferring conduit, and means for sequentially (a) transferring a sample from said sample changer to said sample-receiving carriage, (b) moving said carriage from its sample-receiving position to its position beneath said vertical sample transferring conduit, (c) elevating said sample from said carriage into said sample chamber, and means for moving said sample back to said sample changer in a reverse sequence.

2. Device of claim 1 includes a plurality of sample measurement chambers and a plurality of sample transferring conduits, wherein said sample-receiving carriage includes means for horizontally displacing said sample transversally to the movement of said carriage, and wherein said sequential means includes means for effecting said horizontal displacement while said sample is in said carriage.

3. Device of claim 1 wherein said sequencing means includes pneumatic actuators.

4. Device of claim 1 wherein said measurement chamber is a light-scintillation responsive radioactivity measurement chamber.

5. Device of claim 4 wherein said carriage includes means for preventing external light from entering said chamber at all positions of said carriage.

6. Device of claim 1 wherein said carriage is cylindrical, the axis of said carriage intersecting the axis of said vertical sample transferring conduit.

7. A system for transferring samples from a sample changer to a sample measurement chamber accessible through the bottom thereof, and for thereafter returning the samples to said changer after a measurement period, comprising:

means for transferring samples vertically upward into said chamber, means for transferring samples horizontally from a position near said sample changer to a position aligned with said vertical sample transferring means, means for transferring samples from said sample changer to said horizontal sample transferring means, and means for sequentially effecting the transfer of samples from said changer to said horizontal sample transferring means, from said horizontal sample transferring means to said vertical sample transferring means, from said vertical sample transferring means to said sample measurement chamber, and means for moving said sample back to said sample changer in a reverse sequence.

* * * * *